United States Patent
Nakari

(10) Patent No.: US 10,106,373 B2
(45) Date of Patent: Oct. 23, 2018

(54) ELEVATOR BRAKE CONTROLLER FOR MODULATING DC VOLTAGE

(71) Applicant: KONE CORPORATION, Helsinki (FI)

(72) Inventor: Arto Nakari, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 446 days.

(21) Appl. No.: 14/864,293

(22) Filed: Sep. 24, 2015

(65) Prior Publication Data

US 2016/0101963 A1 Apr. 14, 2016

(30) Foreign Application Priority Data

Oct. 9, 2014 (EP) .................... 14397529

(51) Int. Cl.
- *B66B 1/32* (2006.01)
- *B66B 1/36* (2006.01)
- *B66B 9/00* (2006.01)
- *F16D 65/14* (2006.01)

(52) U.S. Cl.
CPC .............. *B66B 1/36* (2013.01); *B66B 1/32* (2013.01); *B66B 9/00* (2013.01); *F16D 65/14* (2013.01)

(58) Field of Classification Search
CPC .... B66B 1/36; B66B 1/32; B66B 9/00; F16D 65/14
USPC ....... 187/247, 288, 289, 293, 296, 297, 391, 187/393; 188/1.11 R, 1.11 E, 1.11 L, 188/2 A, 137, 158
See application file for complete search history.

(56) References Cited

U.S. PATENT DOCUMENTS

| | | | | |
|---|---|---|---|---|
| 4,928,021 A | * | 5/1990 | Yonemoto ................. | B66B 1/32 187/288 |
| 5,070,290 A | * | 12/1991 | Iwasa ........................ | B66B 5/02 187/288 |
| 5,276,292 A | * | 1/1994 | Goto ........................ | B66B 1/308 187/288 |
| 7,740,110 B2 | * | 6/2010 | Kattainen ................. | B66B 1/32 187/288 |
| 7,775,327 B2 | * | 8/2010 | Abraham ................. | B66B 1/308 187/288 |
| 7,938,231 B2 | * | 5/2011 | Ueda ........................ | B66B 5/02 187/288 |
| 8,207,700 B2 | * | 6/2012 | Syrman ..................... | H02P 3/26 187/288 |

(Continued)

FOREIGN PATENT DOCUMENTS

CN 101800113 A 8/2010
CN 102203452 A 9/2011
(Continued)

*Primary Examiner* — Anthony Salata
(74) *Attorney, Agent, or Firm* — Birch, Stewart, Kolasch & Birch, LLP

(57) ABSTRACT

A brake controller including a DC link for supplying power, the DC link including a positive DC link rail and a negative DC link rail; output terminals for connecting to a magnetizing coil of an electromagnetic brake; a current path established between the DC link and the output terminals for conducting DC link power to the magnetizing coil; and two solid-state switches fitted into the current to adjust output terminal voltage by modulating the DC link voltage.

17 Claims, 3 Drawing Sheets

Legend
1 - DC Link
2A - positive DC link rail
2B - negative DC link rail
3A, 3B, 4A, 4B - output terminals
5', 6' - magnetization coils
7A, 7B - AC power input terminals
8 - AC/DC rectifier
9 - control circuit
10 - input terminal
11 - safety relay
11' - switch contacts
12 - DC link capacitor
13 - resistor
20 - elevator control unit

(56) References Cited

U.S. PATENT DOCUMENTS

| | | | | |
|---|---|---|---|---|
| 8,365,872 B2* | 2/2013 | Ueda | .................. | B66B 5/04 |
| | | | | 187/248 |
| 8,727,075 B2* | 5/2014 | Huppunen | .............. | B60T 8/885 |
| | | | | 187/288 |
| 8,820,484 B2* | 9/2014 | Rui | .................. | B66B 1/32 |
| | | | | 187/288 |
| 8,941,338 B2* | 1/2015 | Villhauer | ................ | B41F 33/12 |
| | | | | 187/288 |
| 9,776,829 B2* | 10/2017 | Kattainen | ................ | B66B 1/32 |
| 2011/0308894 A1 | 12/2011 | Korhonen et al. | | |
| 2015/0053507 A1* | 2/2015 | Kattainen | ................ | B66B 1/32 |
| | | | | 187/288 |
| 2018/0093855 A1* | 4/2018 | Nakari | ...................... | B66B 5/02 |

FOREIGN PATENT DOCUMENTS

| | | |
|---|---|---|
| CN | 102307802 A | 1/2012 |
| WO | WO 2013/178872 A1 | 12/2013 |

* cited by examiner

Legend
1 - elevator car
5, 6 - electromagnetic brakes
14 - elevator car
15 - hoisting machine
16 - traction sheave
17 - elevator shaft
18 - roping
19 - counterweight
20 - elevator control unit
21 - frequency converter

ELEVATOR BRAKE CONTROLLER FOR MODULATING DC VOLTAGE

FIELD OF THE INVENTION

The present invention is related generally to the field of brake controllers for electromagnetic brakes and in particular to control solutions for solid state switches of such brake controllers.

BACKGROUND

An electromagnetic brake may be used for braking of a hoisting machine of an elevator, for braking of an elevator car or for braking of an escalator or a conveyor, for example.

The electromagnetic brake usually includes a stationary brake body and an armature arranged to move relative to the brake body. A spring or corresponding is fitted between the brake body and the armature to apply a thrust force between them. Additionally, an electromagnet with a magnetizing coil is fitted inside the brake body. Brake is disposed in the proximity of an object to be braked, such as a traction sheave of a hoisting machine or a guide rail of an elevator. The brake is applied by driving the armature against the object by means of the thrust force of the spring. Brake is opened by energizing the magnetizing coil. When energized, magnetizing coil causes attraction between the brake body and the armature, which further causes armature to disengage the braked object by resisting thrust force of the spring.

The magnetizing coil is energized/brake is opened by feeding current to the magnetizing coil. A brake controller may be used to selectively open or close the brake according to commands from elevator control. For this reason the brake controller has a main circuit for selectively feeding current to the magnetizing coil or cutting off the current of the magnetizing coil. In normal operation, brake is opened when starting a new elevator run and brake is applied at the end of the run.

To improve brake operation, e.g. to reduce brake noise, reduce heating of the magnetizing coil, adjust brake operation time etc., brake controller may have an adjustable output. For example, it has been suggested to use a controllable solid state switch, such as igbt transistor, mosfet transistor or silicon carbide (SiC) mosfet transistor in the brake controller main circuit to adjust current of the magnetizing coil. However, a further need exists to improve at least reliability and life time of such brake controllers.

AIM OF THE INVENTION

It is the objective of this invention to introduce a new brake controller with improved lifetime and reliability. Therefore the invention discloses a brake controller according to claim 1 and an elevator system according to claim 14. Some preferred embodiments of the invention are described in the dependent claims. Some inventive embodiments, as well as inventive combinations of various embodiments, are presented in the specification and in the drawings of the present application.

SUMMARY OF THE INVENTION

An aspect of the invention is a brake controller, comprising a DC link for supplying power, said DC link including a positive DC link rail and a negative DC link rail, output terminals for coupling a magnetizing coil of an electromagnetic brake to the brake controller, a current path established between the DC link and the output terminals for conducting DC link power to the magnetizing coil and two solid-state switches fitted into the current path. Both said solid state switches are configured to adjust output terminal voltage by modulating the DC link voltage. The phrase "solid-state switches are fitted into the current path" means that current in said current path runs via the solid-state switches.

Another aspect of the invention is an elevator system, comprising an elevator car configured to move vertically inside an elevator shaft between stopping floors according to service requests, and a hoisting machine for driving the elevator car. The elevator system includes one or more electromagnetic brakes for braking movement of the hoisting machine and/or the elevator car. The elevator system comprises a brake controller according to the disclosure for controlling said one or more electromagnetic brakes.

This means that the current of the magnetizing coil can be cut off and also adjusted with at least two separate solid state switches, by adjusting the output terminal voltage. In such a situation the switching losses resulting from the modulation can also be divided between the solid-state switches according to a modulation scheme. This increases reliability and also lifetime of the brake controller.

According to an embodiment, one of the solid-state switches is associated with the positive DC link rail and the other is associated with the negative DC link rail.

According to an embodiment, the brake controller comprises AC power input terminals and a rectifier fitted between the DC link and the AC power input terminals.

According to an embodiment, the brake controller comprises a control circuit coupled to the control poles of the solid-state switches and configured to apply a modulation alternately to each of the switches. This means that while adjusting continuously the output terminal voltage, the switching losses resulting from the modulation may nevertheless be divided by turns to either or the switches, which reduces stress of an individual switch.

According to an embodiment, starting and stopping moment of modulation of an individual switch is determined based on instantaneous temperature or change of the temperature of said switch. Therefore duration and occurrence of the modulation period can be determined such that temperature variation and/or maximum temperature of an individual switch can be reduced.

According to an embodiment, the control circuit is configured to control one of the solid-state switches to conduct continuously while the other is modulating. This means that only conduction losses (e.g. no switching losses) are applied to the continuously-conducting switch.

According to an embodiment, the brake controller comprises a safety input for receiving a safety signal and a relay having a relay contact in series with each of the current lines between AC power input terminals and the rectifier. The safety input is coupled to the control coil of the relay. This means that current supply to the magnetization coil(s) can be cut off with high safety level when the safety signal indicates an operational anomaly that must be followed.

According to an embodiment, the brake controller comprises a DC link capacitor connected between positive and negative DC link rails to even out voltage variations in the DC link. This also means that energy returning from the magnetization coil(s) back to the DC link can be stored in the DC link capacitor for reuse.

According to an embodiment, the brake controller comprises two current clamping diodes, one of which is connected between first output terminal and negative DC link rail and the other is connected between second output terminal and positive DC link rail. This means that magnetic energy can be returned from magnetization coil back to the DC link via the current clamping diodes.

According to an embodiment, the length of the modulation period is for both solid state switches substantially the same. Therefore, when similar solid state switches with same modulating frequency are used, also power losses between the solid-state switches are substantially the same.

According to an embodiment, the solid-state switches are similar. This is advantageous as it is much easier to design the solid-state switches for a same lifetime when they have exactly the same operating characteristics. This is also congruent with the disclosed modulation method of the solid-state switches.

According to an embodiment, the brake controller has two separate sets of output terminals for conducting DC link power to two separate magnetizing coils, and the brake controller comprises separate current paths established between the DC link and the first set of output terminals and the DC link and the second set of output terminals for conducting DC link power to the corresponding magnetizing coil. The brake controller comprises two solid-state switches in both said current paths between the DC link and the corresponding output terminal. In both said current paths, both of the solid state switches are configured to adjust corresponding output terminal voltage by modulating the DC link voltage.

According to an embodiment, in both current paths one of the solid-state switches is connected to the positive DC link rail and the other is connected to the negative DC link rail. The control circuit is coupled to the control poles of the solid-state switches of both of the current paths. The control circuit is configured to apply a modulation alternately to each of the solid-state switches of the first current path. The control circuit is also configured to apply a modulation by turns to both of the solid-state switches of the second current path.

BRIEF DESCRIPTION OF THE DRAWINGS

In the following, the invention will be described in more detail by the aid of some examples of its embodiments, which in themselves do not limit the scope of application of the invention, with reference to the attached drawings, wherein.

MORE DETAILED DESCRIPTION OF PREFERRED EMBODIMENTS OF THE INVENTION

Figure 1:
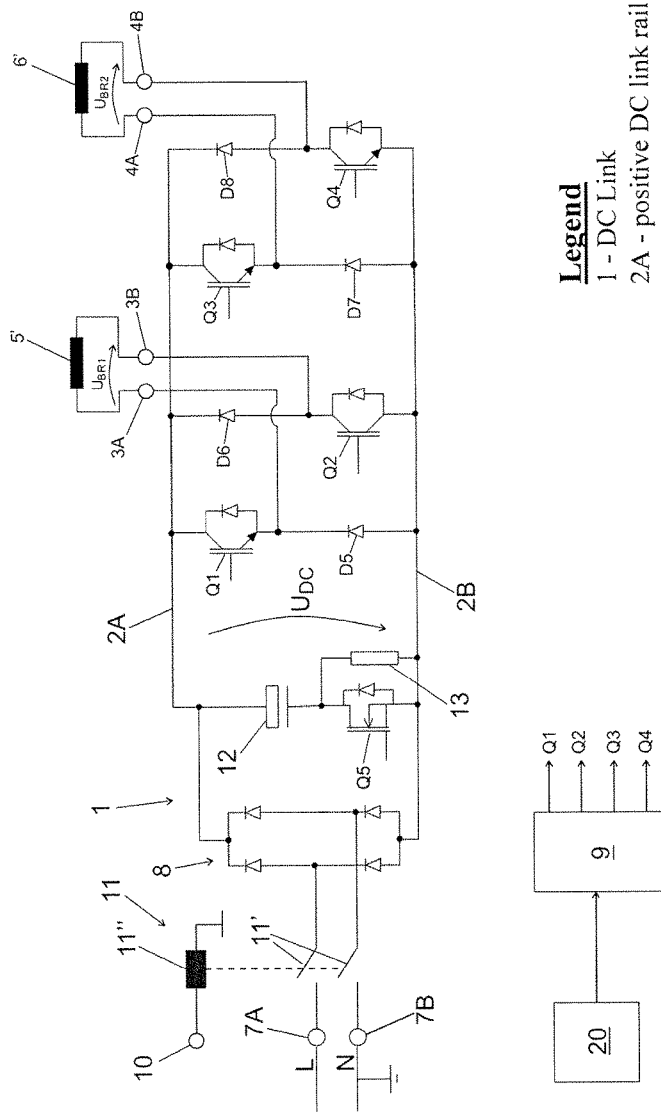
FIG. 1 represents schematic of a main circuit of a brake controller according to an embodiment.
Figure 2:
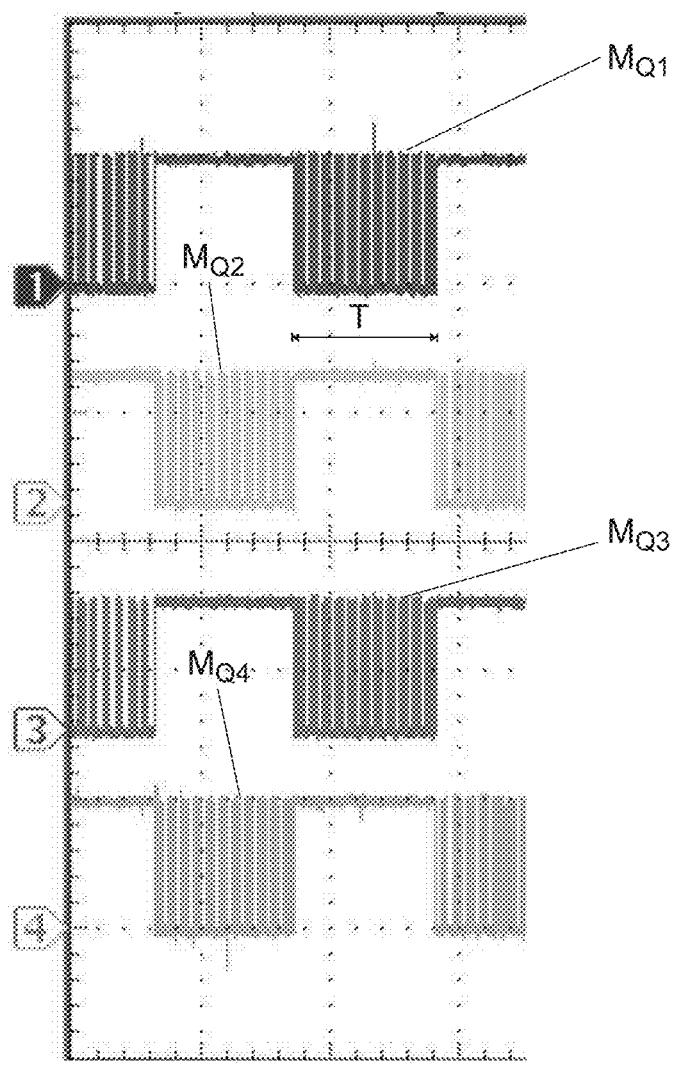
FIG. 2 illustrates control principle of a brake controller according to an embodiment.
Figure 3:
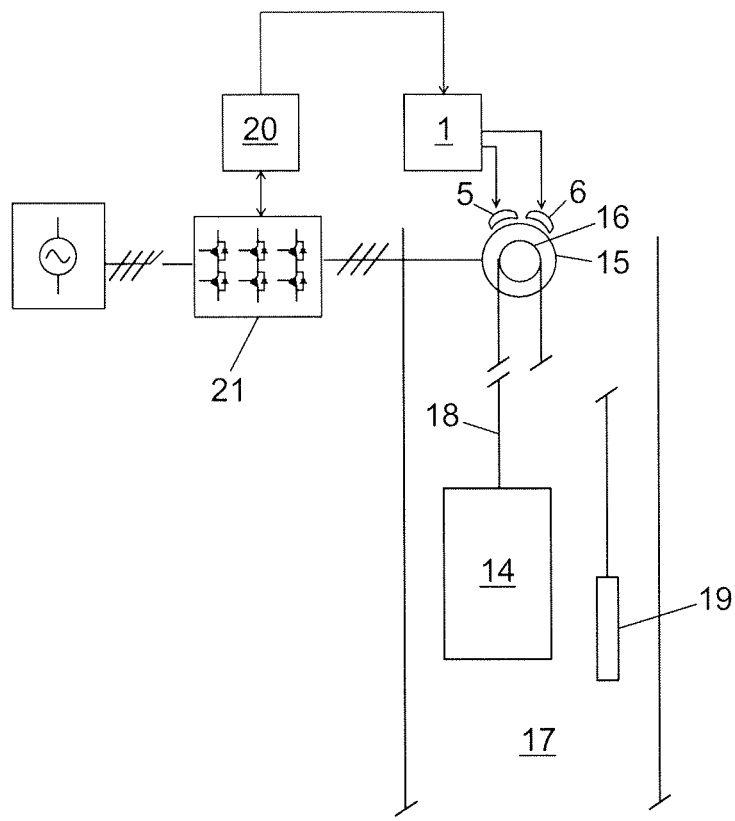
FIG. 3 represents an elevator system according to an embodiment.

For the sake of intelligibility, in FIGS. 1-3 only those features are represented which are deemed necessary for understanding the invention. Therefore, for instance, certain components/functions which are widely known to be present in corresponding art may not be represented.

In the description same references are always used for same items.

FIG. 1 is a schematic of a main circuit of a brake controller according to an exemplary embodiment. The brake controller has AC power input terminals 7A, 7B for connecting the brake controller to power supply cables L, N.

The brake controller is supplied with one-phase alternating current (AC) system having phase conductor L and neutral conductor N coming from a supply transformer. In some embodiments, neutral conductor N is also earthed near the supply transformer (protective earth). In some other embodiments, on the other hand, neutral conductor N is left unearthed.

AC/DC-rectifier 8 is fitted between DC link 1 and AC power input terminals 7A, 7B. The positive DC voltage output of rectifier 8 is connected to positive DC link rail 2A and the negative DC voltage output of the rectifier 8 is connected to negative DC link rail 2B of DC link 1.

DC link capacitor 12 is connected between positive 2A and negative 2B DC link rails. The purpose of DC link capacitor 12 is to store DC link energy and even out DC link voltage variations. DC link capacitor 12 is connected to negative DC link rail 2B by means of charging switch Q5, which is a mosfet transistor. When switch Q5 is open (e.g. not conducting), DC link capacitor 12 is charged through resistor 13. When the voltage over DC link capacitor 12 reaches a given threshold, switch Q5 is closed (controlled to conducting state) such that DC link capacitor 12 is connected to negative DC link rail 2B via switch Q5.

The brake controller has two control channels associated with two separate sets of output terminals 3A, 3B; 4A, 4B. Two separate magnetizing coils 5', 6' of electromagnetic brakes may be connected to said output terminals 3A, 3B; 4A, 4B. The two control channels have separate current paths established between DC link 1 and separate sets of output terminals 3A, 3B; 4A, 4B such that the brake controller is operable to control supply of current to magnetizing coils 5', 6' independent of each other.

Because the operation principle of both current paths/control channels is similar, the detailed brake controller operation is disclosed in the following as for one control channel only. The control channel associated with magnetizing coil 5' is disclosed in further details. The disclosure applies, however, to the control channel associated with magnetizing coil 6' as well.

Current path of the first control channel goes from positive DC link rail 2A through output terminal 3A to magnetizing coil 5' and further through output terminal 3B back to negative DC link rail 2B such that electric power is supplied from DC link 1 to magnetizing coil 5' through output terminals 3A, 3B.

The brake controller comprises two solid-state switches Q1, Q2 in the form of igbt transistors fitted into the current path. Instead of igbt transistors also other kind of controllable solid-state switches such as mosfet transistors or bipolar transistors may be used. Igbt transistor Q1 is connected to positive DC link rail 2A and igbt transistor Q2 is connected to negative DC link rail 2B. Igbt transistors Q1, Q2 are configured to adjust output terminal voltage $U_{BR1}$, that is, voltage between output terminals 3A, 3B, by modulating the DC link voltage $U_{DC}$. The term modulation means a specific high-frequency switching pattern applied to igbt-transistor Q1, Q2 to create modulated output terminal voltage $U_{BR1}$. As is known, the DC level of modulated output terminal voltage $U_{BR1}$ may be adjusted by changing the modulation parameter. The modulation parameter depends on the modulation method used; it may be the pulse width of the switching pattern (pulse width modulation, PWM), frequency of the switching pattern (frequency modulation, FM), or the hysteresis level of hysteresis control, for example. The switching frequency may vary from one embodiment to another, and it is preferably between 10 KHz and 200 KHz to cancel switching noise.

Further, two current clamping diodes D5, D6 are coupled to the output terminals such that diode D5 is connected between output terminal 3A and negative DC link rail 2B and diode D6 is connected between output terminal 3B and positive DC link rail 2A. When both igbt transistors Q1, Q2 are switched off simultaneously, magnetization coil 5' current has passage via diodes D5, D6 back to DC link 1 such that energy can be returned from magnetization coil 5' to DC link capacitor 12. This has the effect that the current of magnetizing coil 5' rapidly ceases to zero. Therefore, cut-off process of magnetizing coil 5' current may be accelerated by simultaneously switching off igbt transistors Q1, Q2.

The brake controller comprises computer-implemented control circuit 9 coupled to the control gates of igbt transistors Q1, Q2 and configured to apply a modulation alternately to igbt transistors Q1, Q2. In FIG. 2 references $M_{Q1}$ and $M_{Q2}$ represent modulation patterns of igbt transistors Q1 and Q2 and references $M_{Q3}$ and $M_{Q4}$ represent modulation patterns of igbt transistors Q3 and Q4 in the other control channel. As can be seen from FIG. 2, control circuit 9 applies a continuous high-level control signal to one of igbt transistors Q1, Q2; Q3, Q4 in both of the control channels to cause said igbt transistor to conduct continuously while the other Q1, Q2; Q3, Q4 is modulating according to control pattern $M_{Q1}$, $M_{Q2}$; $M_{Q3}$, $M_{Q4}$. The length of modulation period T is approximately 100 ms and it is the same for all igbt transistors Q1, Q2; Q3, Q4. In some other embodiments, however, the length of modulation period T may vary. In an alternative embodiment, the length of modulation period T is 100 ms for igbt transistors Q2, Q4 connected to negative DC link rail 2B and 150 ms for igbt transistors Q1, Q3 connected to positive DC link rail 2A.

This means that switching losses may be divided alternately to the igbt transistors, which reduces stress of an individual igbt transistor, because instantaneous temperature and/or change of the temperature of an individual igbt transistor stays within allowed limits. All the igbt transistors Q1, Q2; Q3, Q4 of brake controller 1 are also similar, e.g. of the same type and specification, which means that it is much easier to design igbt transistors Q1, Q2; Q3, Q4 for the same lifetime when they have exactly the same operating characteristics.

The brake controller further comprises safety relay 11. Normal open (N.O.) switch contacts 11' of safety relay 11 are coupled in series with current lines L, N between AC power input terminals 7A, 7B and rectifier 8, such that the brake controller main circuit can be separated from power supply cables L, N by opening switch contacts 11'. Instead of safety relay 11 a contactor could also be used. Input terminal 10 is coupled to control coil 11" of safety relay 11. The state signal of the elevator safety chain is connected to input terminal 10. When the safety chain detects an operating anomaly in the elevator system, it causes interruption of current supply to control coil 11'. This has the effect that the current supply to magnetization coils 5', 6' is interrupted and the corresponding electromagnetic brakes are applied. In some embodiments, the electromagnetic brakes are configured to brake the hoisting machine of the elevator car. In some embodiments, the electromagnetic brakes are configured to brake the elevator car against a guide rail.

FIG. 3 is a schematic of an elevator system according to an exemplary embodiment. The elevator system comprises elevator car 14 configured to move vertically inside elevator shaft 17 between stopping floors according to service requests from elevator passengers, as is known in the art. Elevator control unit 20 is operable to process the service requests and calculate a target speed for movement of elevator car 1. Hoisting machine 15 is mounted near the top end of elevator shaft 17. Hoisting machine 15 includes a permanent magnet motor and traction sheave 16, mounted to the axis of the permanent magnet motor. Frequency converter 21 is connected to the stator of the permanent magnet motor for supplying power to the permanent magnet motor. Elevator car 14 and counterweight 19 are suspended with hoisting roping 18. Hoisting roping 18 runs via traction sheave 16 of hoisting machine 15. The permanent magnet motor drives traction sheave 16 causing elevator car 14 and counterweight 19 to move in opposite directions in elevator shaft 17.

Alternatively, hoisting machine 15 may be disposed in the elevator shaft pit. The elevator system may also have separate hoisting roping and suspension roping. In this case the hoisting roping may run via the traction sheave of hoisting machine disposed in the pit. Further, the suspension roping may be coupled to at least one pulley near top end of the shaft. The term "roping" is understood to refer to traditional circular ropes as well as belts. Alternatively, hoisting machine 15 and frequency converter 21 may be disposed in a machine room separate from shaft 17. The elevator according to the disclosure may also be implemented without counterweight 19.

Hoisting machine 15 of FIG. 1 comprises two electromagnetic brakes 5, 6 for braking the movement of traction sheave 16. As is known in the art, electromagnetic brakes 5, 6 include a stationary brake body and an armature arranged to move relative to the brake body. A spring is fitted between the brake body and the armature to apply a thrust force between them. An electromagnet with magnetizing coil 5', 6' is fitted inside the brake body. Brakes 5, 6 are applied by driving the armature against the braking surface of hoisting machine 15 by means of the thrust force of the spring. Brakes 5, 6 are opened by energizing magnetizing coil 5', 6'. When energized, magnetizing coils 5', 6' cause attraction between the brake body and the armature, which further causes armature to disengage the braked object by resisting thrust force of the spring.

Brake controller 1 according to FIGS. 1 and 2 is connected to magnetizing coils 5', 6' to selectively open or close brakes 5, 6 according to commands from elevator control unit 20.

In normal operation, brakes 5, 6 are opened when starting a new elevator run, and brakes 5, 6 are applied at the end of the run to hold elevator car 14 at standstill. During normal operation, brakes 5, 6 are controlled open by feeding a current to magnetization coils 5', 6' by modulating igbt transistors Q1, Q2; Q3, Q4 as disclosed above. Thus, output terminal voltages $U_{BR1}$, $U_{BR2}$ are adjusted such that the current through magnetization coils 5', 6' is limited to a value that is enough to keep the brakes open but at the same time not unnecessarily large such that heating of brakes 5, 6 may be reduced.

If the elevator safety chain detects an emergency during elevator run, an emergency stop is performed. The elevator safety chain interrupts supply of current to control coil 11' of safety relay 11. Therefore, the current supply to magnetization coils 5', 6' is interrupted, brakes 5, 6 are applied and the elevator car is brought into standstill by braking the movement of traction sheave 16.

It is obvious to a skilled person that more than two solid-state switches may be fitted into current path of the control channel. If only one of the solid-state switches is modulated at a time while the other ones are conducting continuously, switching losses of an individual solid-state switch may be further reduced.

It is further obvious to a person skilled in the art that one or more of the aforementioned electronic devices can also be integrated together e.g. onto the same circuit card/into the same control unit.

It is further obvious to a skilled person that the above-disclosed brake controller 1 may be used to control the electromagnetic brake of an escalator or a conveyor also.

The invention is described above by the aid of exemplary embodiments. It is obvious to a person skilled in the art that the invention is not limited to the embodiments described above and many other applications are possible within the scope of the inventive concept defined by the claims.

The invention claimed is:

1. A brake controller, comprising:
    a DC link for supplying power, said DC link including a positive DC link rail and a negative DC link rail;
    output terminals for coupling a magnetizing coil of an electromagnetic brake to the brake controller; and
    a current path established between said DC link and said output terminals for conducting DC link power to said magnetizing coil;
    wherein the brake controller comprises two solid-state switches fitted into the current path,
    wherein said solid-state switches are configured to adjust output terminal voltage by modulating the DC link voltage, and
    wherein the brake controller comprises a control circuit coupled to control poles of the solid-state switches and configured to apply a modulation alternately to the solid-state switches.

2. The brake controller according to claim 1, wherein one of the solid-state switches is connected to the positive DC link rail and the other of the solid-state switches is connected to the negative DC link rail.

3. The brake controller according to claim 1, wherein the brake controller comprises:
    AC power input terminals; and
    a rectifier fitted between the DC link and the AC power input terminals.

4. The brake controller according to claim 1, wherein starting and stopping moment of the modulation of an individual solid-state switch is determined based on instantaneous temperature or change of the temperature of said solid-state switch.

5. The brake controller according to claim 1, wherein the control circuit is configured to control one of the solid-state switches to conduct continuously while the other solid state switch is modulating.

6. The brake controller according to claim 3, wherein the brake controller comprises:
    a safety input for receiving a safety signal; and
    a relay having a relay contact coupled in series with each of the current lines between AC power input terminals and the rectifier,
    wherein the safety input is coupled to the control coil of the relay and is configured to cut off current supply to the magnetizing coil when the safety signal indicates an operational anomaly.

7. The brake controller according to claim 1, wherein the brake controller comprises a DC link capacitor connected between positive and negative DC link rails.

8. The brake controller according to claim 1, wherein the brake controller comprises two current clamping diodes, one of the current clamping diodes being connected between the first output terminal and the negative DC link rail and the other of the current clamping diodes being connected between the second output terminal and the positive DC link rail.

9. The brake controller according to claim 1, wherein the solid-state switches have a same modulating frequency.

10. The brake controller according to claim 1, wherein a length of the modulation period is substantially the same for both solid state switches.

11. The brake controller according to claim 1, wherein the brake controller has two separate sets of output terminals for conducting DC link power to two separate magnetizing coils,
    wherein the brake controller comprises separate current paths established between the DC link and the first set of terminals and the DC link and the second set of terminals for conducting DC link power to the corresponding magnetizing coil,
    wherein the brake controller comprises two solid-state switches in both said current paths between the DC link and the corresponding output terminal, and
    wherein in both said current paths, both of the solid-state switches are configured to adjust corresponding output terminal voltage by modulating the DC link voltage.

12. The brake controller according to claim 11, wherein in both current paths, one of the solid-state switches is connected to the positive DC link rail and the other of the solid-state switches is connected to the negative DC link rail,
    wherein the control circuit is coupled to the control poles of the solid-state switches of both of the current paths,
    wherein the control circuit is configured to apply a modulation alternately to the solid-state switches of the first current path, and
    wherein the control circuit is configured to apply a modulation alternately to the solid-state switches of the second current path.

13. An elevator system, comprising:
    an elevator car configured to move vertically inside an elevator shaft between stopping floors according to service requests;
    a hoisting machine for driving the elevator car; and
    one or more electromagnetic brakes for braking movement of the hoisting machine and/or the elevator car,
    wherein the elevator system comprises the brake controller according to claim 1 for controlling said one or more electromagnetic brakes.

14. The brake controller according to claim 2, wherein the brake controller comprises:
    AC power input terminals; and
    a rectifier fitted between the DC link and the AC power input terminals.

15. The brake controller according to claim 4, wherein the control circuit is configured to control one of the solid-state switches to conduct continuously while the other of the solid-state switches is modulating.

16. The brake controller according to claim 1, wherein the brake controller comprises:
    a safety input for receiving a safety signal; and
    a relay having a relay contact coupled in series with each of the current lines between AC power input terminals and the rectifier,
    wherein the safety input is coupled to the control coil of the relay and is configured to cut off current supply to the magnetizing coil when the safety signal indicates an operational anomaly.

17. The brake controller according to claim 4, wherein the brake controller comprises:
    a safety input for receiving a safety signal; and a relay having a relay contact coupled in series with each of the current lines between AC power input terminals and the rectifier, wherein the safety input is coupled to the control coil of the relay and is configured to cut off current supply to the magnetizing coil when the safety signal indicates an operational anomaly.

\* \* \* \* \*